US012648673B2

(12) United States Patent
Aditjandra et al.

(10) Patent No.: US 12,648,673 B2
(45) Date of Patent: Jun. 9, 2026

(54) PORTABLE BLADE GRINDER

(71) Applicant: WHIRLPOOL CORPORATION, Benton Harbor, MI (US)

(72) Inventors: Antonius K. Aditjandra, St. Joseph, MI (US); Richard D. Arnold, St. Joseph, MI (US); Nicholas Hill Schutte, St. Joseph, MI (US); Rex D. Wilson, Stevensville, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 497 days.

(21) Appl. No.: 18/232,086

(22) Filed: Aug. 9, 2023

(65) Prior Publication Data

US 2024/0090706 A1     Mar. 21, 2024

Related U.S. Application Data

(60) Provisional application No. 63/407,883, filed on Sep. 19, 2022.

(51) Int. Cl.
| | |
|---|---|
| *A47J 43/08* | (2006.01) |
| *A47J 42/26* | (2006.01) |
| *A47J 42/28* | (2006.01) |
| *A47J 42/46* | (2006.01) |
| *A47J 43/046* | (2006.01) |
| *A47J 43/07* | (2006.01) |

(52) U.S. Cl.
CPC ............. *A47J 43/085* (2013.01); *A47J 42/26* (2013.01); *A47J 42/28* (2013.01); *A47J 42/46* (2013.01); *A47J 43/046* (2013.01); *A47J 43/0722* (2013.01); *A47J 43/0727* (2013.01)

(58) Field of Classification Search
CPC .. A47J 43/0716; A47J 43/0722; A47J 43/085; A47J 43/046; A47J 43/08; A47J 42/26; A47J 42/46
See application file for complete search history.

(56) References Cited

U.S. PATENT DOCUMENTS

| | | | | |
|---|---|---|---|---|
| 4,081,144 A | * | 3/1978 | Bouillet .............. | A47J 43/0772 241/37.5 |
| 2009/0032627 A1 | * | 2/2009 | Krasznai ................. | A47J 42/46 241/36 |
| 2016/0345779 A1 | * | 12/2016 | Tu ........................ | A47J 43/0727 |

* cited by examiner

*Primary Examiner* — Bobby Yeonjin Kim
(74) *Attorney, Agent, or Firm* — Price Heneveld LLP

(57) ABSTRACT

A blade grinder that includes a base unit having a housing. The housing encloses a drive motor and defines a receiving cavity. A battery receiver is defined along a portion of the housing and a battery is removably coupled to the battery receiver. A blade implement is disposed within the receiving cavity, wherein the blade implement is configured to be driven by the drive motor. A bowl is positionable in an operably disposed condition within the receiving cavity. A lid is couplable to the housing to retain the bowl in the operably disposed condition within the receiving cavity.

19 Claims, 5 Drawing Sheets

PORTABLE BLADE GRINDER

CROSS-REFERENCE TO RELATED APPLICATION

This application claims priority to and the benefit under 35 U.S.C. § 119(e) of U.S. Provisional Application No. 63/407,883, filed on Sep. 19, 2022, entitled "PORTABLE BLADE GRINDER," the disclosure of which is hereby incorporated herein by reference in its entirety.

BACKGROUND OF THE DISCLOSURE

The present disclosure generally relates to a blade grinder, and more specifically, to a portable blade grinder.

SUMMARY OF THE DISCLOSURE

According to one aspect of the present disclosure, a blade grinder includes a base unit having a drive motor and a housing defining a receiving cavity. The housing encloses the drive motor. A battery receptacle is defined on a portion of the housing, the battery receptacle having a plurality of terminals accessible therein and configured to removably couple a battery with the base unit to operably power the drive motor. A coupler is disposed within the receiving cavity and configured to be driven by the drive motor. A bowl is positionable in an operably disposed condition within the receiving cavity and having a blade implement operably coupled therein and configured to be rotatably driven by the coupler when the bowl is in the operably disposed condition. A lid is couplable to the housing to retain the bowl in the operably disposed condition within the receiving cavity.

According to another aspect of the present disclosure, a blade grinder includes a base unit that has a housing. The housing encloses a drive motor and defines a receiving cavity. A foot ring is disposed within the receiving cavity. The foot ring is coupled to an inner surface of the housing that encircles the receiving cavity. A battery receiver is defined along a portion of the housing. The battery receiver has a plurality of terminals housed therein. A battery is removably coupled to the battery receiver. The base unit is configured to operably power the drive motor via the battery. A blade implement is disposed within the receiving cavity. The blade implement is configured to be driven by the drive motor. A bowl is positionable in an operably disposed condition within the receiving cavity. The foot ring is configured to resiliently deform as the bowl is positioned in the operably disposed condition. A lid is couplable to the housing to retain the bowl in the operably disposed condition within the receiving cavity.

According to yet another aspect of the present disclosure, a blade grinder includes a base unit having a housing. The housing encloses a drive motor and defining a receiving cavity. The foot ring is disposed within the receiving cavity and coupled to an inner surface of the housing that encircles the receiving cavity. A projection extends outward from the housing and intersecting with the housing at a projection corner. A battery receiver is defined within the projection. The battery receiver having a plurality of terminals exposed on an open interior thereof. A battery is removably coupled to the battery receiver. The base unit is configured to operably power the drive motor using the battery by electrically coupling with the terminals. The coupler is disposed within the receiving cavity and configured to be driven by the drive motor. A bowl is positionable in an operably disposed condition within the receiving cavity and having a blade implement operably coupled therein and configured to be rotatably driven by the coupler. The bowl is positionable between a resting condition and an engaged condition. The lid is couplable to the housing to retain the bowl in the operably disposed condition within the receiving cavity. The bowl is in the resting condition when the lid is decoupled form the housing. The bowl is in the engaged condition when the lid is coupled to the housing. The coupling between the lid and the housing provides a retaining force that compresses the foot ring against a portion of the bowl.

These and other features, advantages, and objects of the present disclosure will be further understood and appreciated by those skilled in the art by reference to the following specification, claims, and appended drawings.

In the drawings:

Figure 1:
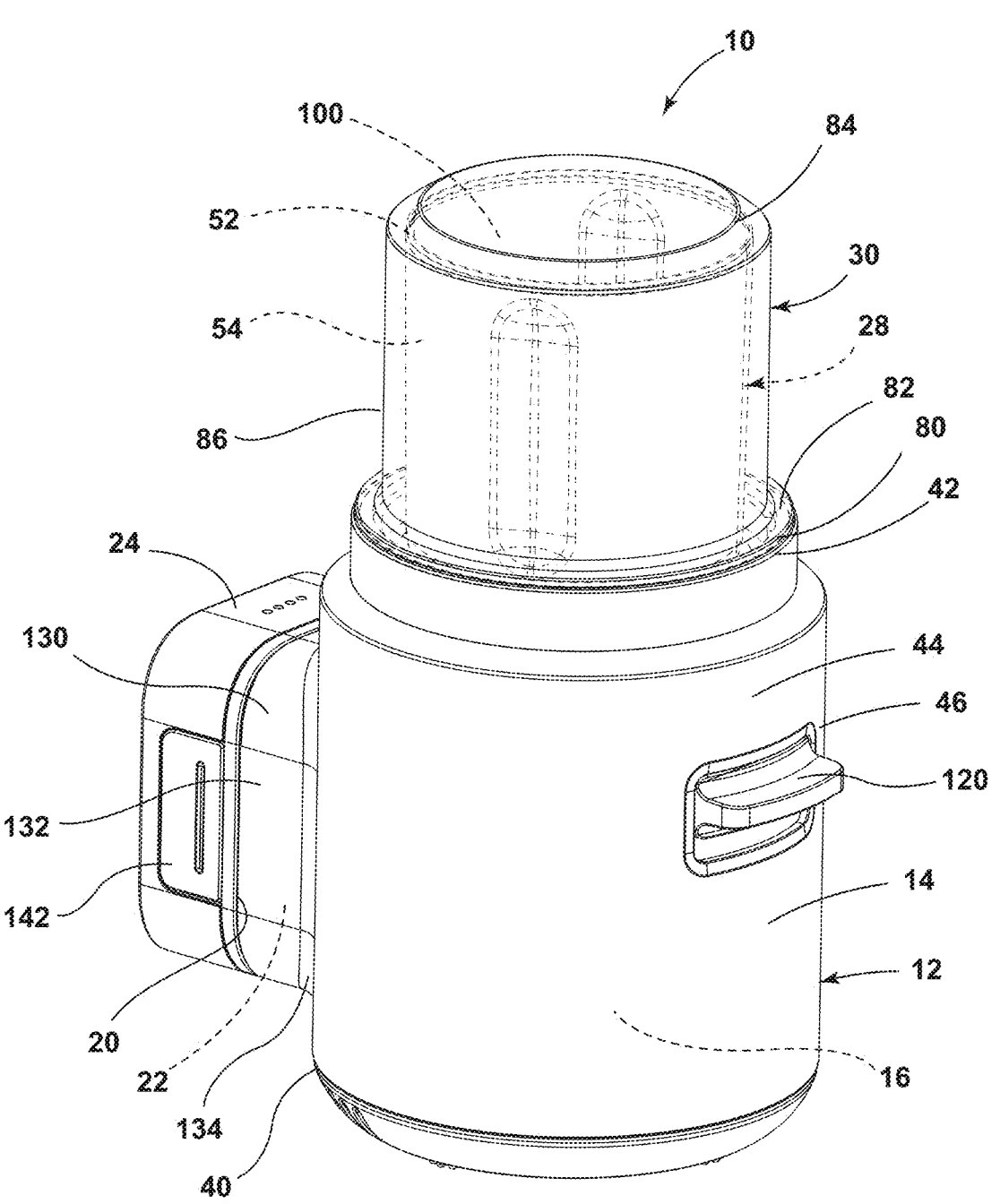
FIG. 1 is a top perspective view of a blade grinder, according to one embodiment.

The components in the figures are not necessarily to scale, emphasis instead being placed upon illustrating the principles described herein.

DETAILED DESCRIPTION

The present illustrated embodiments reside primarily in combinations of method steps and apparatus components related to a kitchen appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-5, reference numeral 10 generally designates a blade grinder 10. The blade grinder 10 includes a base unit 12 and a housing 14. The housing 14 encloses a drive motor 16 and defines a receiving cavity 18. A battery receiver 20 is defined along a portion of the housing 14 and includes a plurality of terminals 22 housed within the battery receiver 20. A battery 24 is removably couplable to the battery receiver 20 and the plurality of terminals 22. The base unit 12 is configured to operably power the drive motor 16 using power from the battery 24. A blade implement 26 is rotatably mounted within the receiving cavity 18 and a bowl 28 is disposable within the receiving cavity 18. A lid 30 is opposing the bowl 28 and is coupled to the housing 14.

Figure 2:
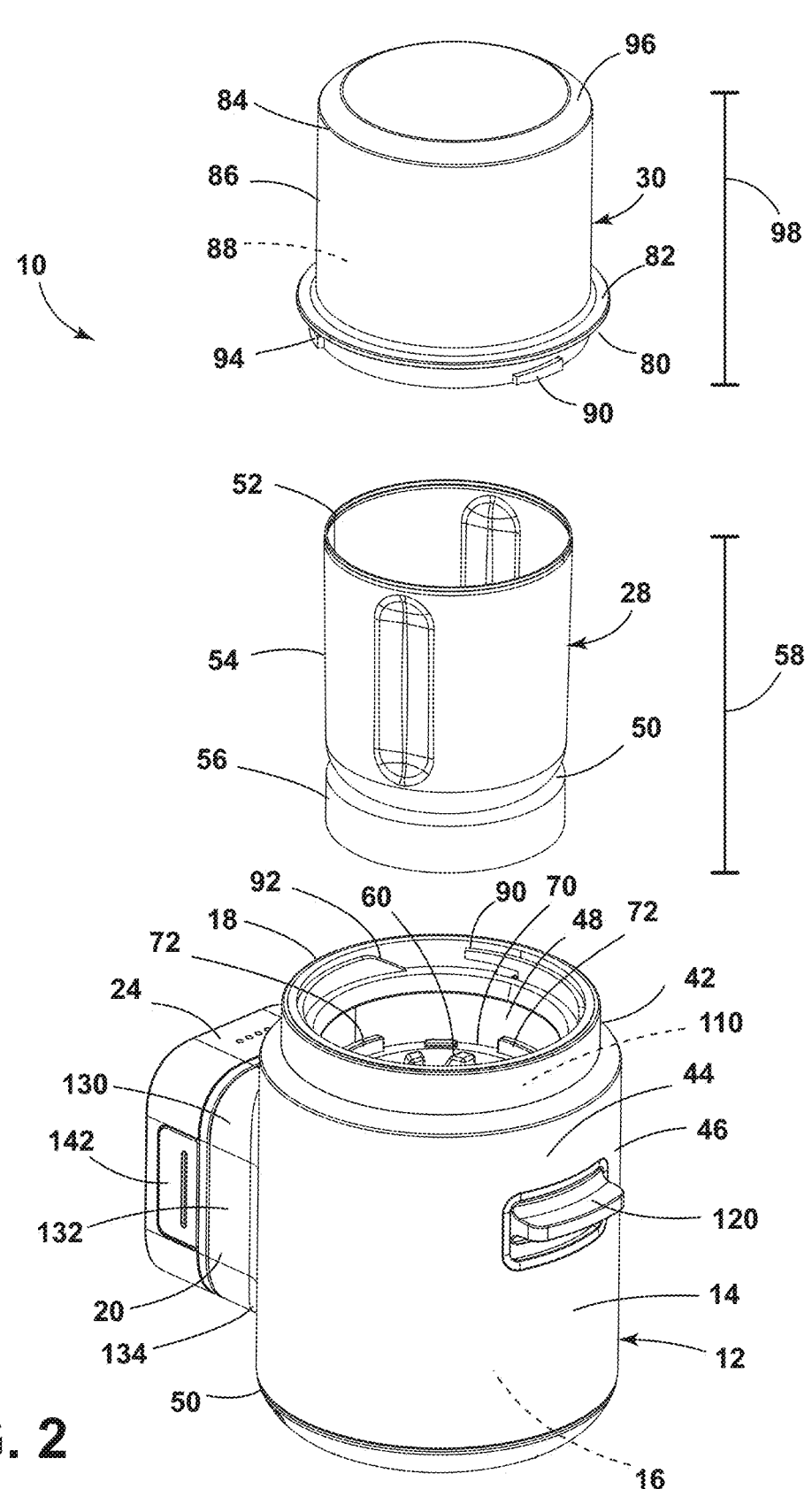
FIG. 2 is a partially exploded, top perspective view of a blade grinder having a bowl and a lid, according to one embodiment.
Figure 3:
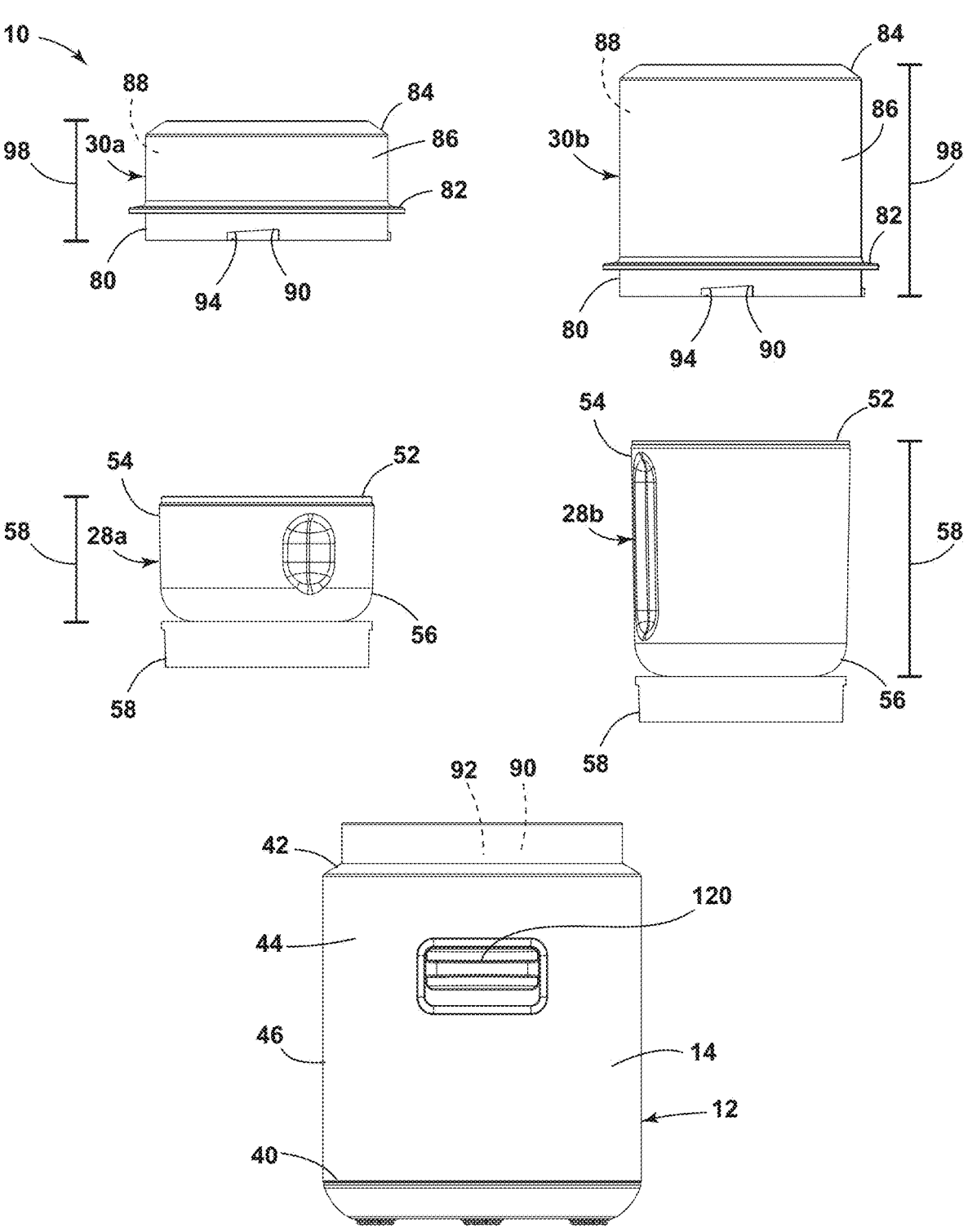
FIG. 3 is a front view of a blade grinder having a first bowl, a second bowl, a first lid, and a second lid, according to one embodiment.
Figure 4:
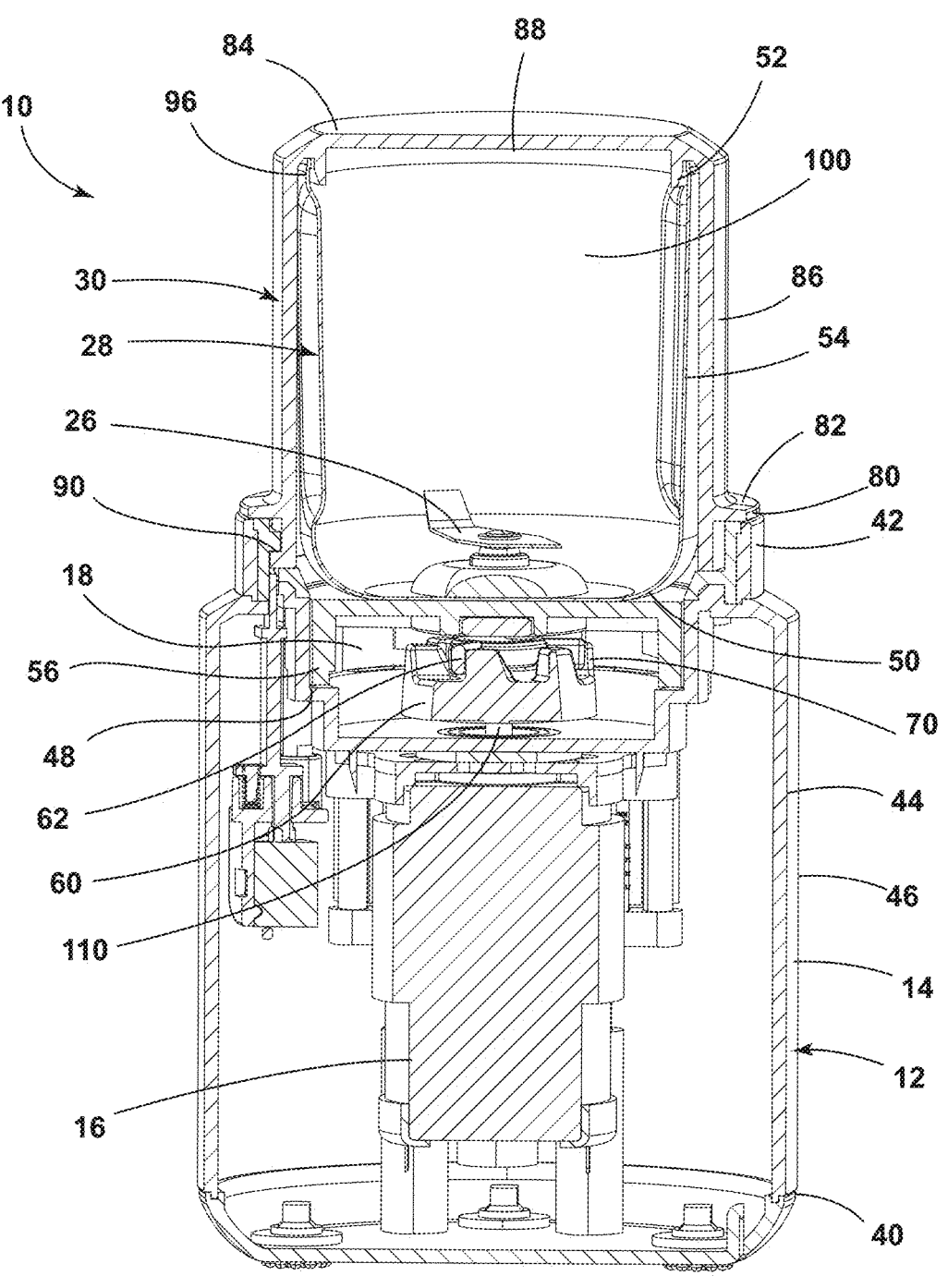
FIG. 4 is a cross-sectional front view of a blade grinder, according to one embodiment.

Referring to FIGS. 1-4, the housing 14 includes a bottom portion 40, a top portion 42, and an outer portion 44 defined between the bottom portion 40 and the top portion 42. As illustrated in FIG. 4, the outer portion 44 may comprise a substantially cylindrical shape, the cylindrical shape having a housing outer curvature 46. Referring to FIGS. 2 and 4, the top portion 42 of the housing 14 defines the receiving cavity 18. The housing top portion 42 further includes an inner surface 48. As illustrated in FIG. 2, the inner surface 48 may encircle an outside periphery of the receiving cavity 18.

Referring to FIGS. 1-5, the bowl 28 includes a bottom section 50, a top edge 52 opposing the bottom section 50, a side section 54 defined between the bottom section 50 and the top edge 52, and a bowl collar 56 below and coupled to the bottom section 50. As illustrated in FIGS. 1-3, the bowl 28 is movable between a disassembled condition and a resting condition. In the disassembled condition, the bowl 28 is remote from the receiving cavity 18 and the lid 30. In the resting condition, the bowl collar 56 is positioned within the receiving cavity 18, as discussed further below. As particularly shown in FIG. 4, when in the resting condition, the bowl collar 56 contacts and is supported by a foot ring 70. In the illustrated example, the receiving cavity 18 is defined by generally a straight side wall above the foot ring 70 such that the bowl collar 56 is received in the receiving cavity 18 in a "drop-in" arrangement, wherein the bowl 28 is moved from the disassembled condition and the resting condition by aligning the bowl 28 with the top portion 42 of the housing 14 and moved downwardly such that the bowl collar 56 slides into a received position within the receiving cavity. In other variations, the bowl collar 56 may engage with the foot ring 70. For example, the bowl collar 56 may engage with the foot ring 70 via a bayonet interlock with channels. Additionally, it is also contemplated that the blade grinder 10 may include a plurality of bowls 28 of varying bowl depths 58. For example, the blade grinder 10 may have a first bowl 28a and a second bowl 28b, the second bowl 28b having a bowl depth 58 greater than the first bowl 28a.

Referring further to FIGS. 2 and 4, the foot ring 70 may be coupled to the housing inner surface 48. In some embodiments, the foot ring 70 may be fixed coupled to the housing inner surface 48. In other embodiments, the foot ring 70 may be integrally formed from the housing inner surface 48. As illustrated in FIG. 2, the foot ring 70 includes a plurality of feet 72 disposed around a periphery of the housing inner surface 48. The feet 72 may extend outward from the housing inner surface 48 and define one of various shapes, such as a quadrilateral shape, a rounded-shape and/or one of other various shapes. The feet 72 may be of thermoplastic elastomer ("TPE") and may be configured to support the bowl collar 56 when the bowl 28 is received within the receiving cavity 18. The use of TPE in connection with the feet 72 is such that the feet 72 are resiliently deformable with continued movement of the bowl collar 56 into the receiving cavity 18. In a variation, the foot ring 70 may be a unitary structure with the plurality of feet 72 defined therewith. As provided herein, the foot ring 70 is configured to contact the bowl collar 56 and provide a resistive, dampening force when the bowl 28 is in the resting condition.

Referring to FIGS. 1-5, the lid 30 includes an engagement segment 80 having a lid lip 82 above the engagement segment 80, a top segment 84 opposite the engagement segment 80, a side segment 86 defined between the engagement segment 80 and the top segment 84, and an inside surface 88 defined along an inside periphery of the lid 30. Referring to FIGS. 1-3, the lid 30 is movable between a disengaged condition and an engaged condition. In the disengaged condition, the lid 30 is removed from and positionable remote from the housing 14. In the engaged condition, the engagement segment 80 is coupled to the top portion 42 of the housing 14, the lid lip 82 is in contact with the top portion 42 of the housing 14, the side segment 86 is proximate to and generally coplanar with the bowl side section 54. In this arrangement, the inside surface 88 along the top segment 84 of the lid 30 is proximate to and in contact with the bowl top edge 52 such that the lid 30, when in the engaged position encloses the top segment 84 of the bowl 28 and may, in certain aspects, maintain the bowl 28 in the use position on the housing 14, as discussed above. In particular, the engagement segment 80, in some variations, may contact and couple to the housing top portion 42 via a lid bayonet interlock 90. In such a variation, a first portion 92 of the lid bayonet interlock 90 is defined on the engagement segment 80 and a second portion 94 of the lid bayonet interlock 90 is defined on the top portion 42 of the housing 14. The engagement of the lid bayonet interlock 90 may then provide a retaining force sufficient to keep the lid 30 coupled to the housing 14. In some aspects, the retaining force provided by the lid bayonet interlock 90 may also provide a retaining force sufficient to compress the feet 72 that support the bowl collar 56 to retain the bowl 28 in engagement with the housing 14 under a compressive force that, in at least one aspect, maintains the inside surface 88 in consistent contact with the top segment 84 of the bowl 28. In particular, the engagement of the lid bayonet interlock 90 may apply a downward directed force on the lid 30, the downward directed force being transferred via the contact between the lid top segment 84 and the bowl top edge 52. In such aspects, the downward directed force applied to the bowl 28 compresses the foot ring 70 such that the bowl is maintained in an engaged condition. Additionally, the lid top segment 84 may define a lid channel 96, the lid channel 96 being configured to receive the bowl top edge 52 when thusly configured.

With further reference to FIG. 3, it is contemplated that the blade grinder 10 may include a plurality of lids 30 of varying lid heights 98. For example, the blade grinder 10 may have a first lid 30a and a second lid 30b, the second lid 30b having a greater lid height 98 than the first lid 30a. It is also generally contemplated that the lid height 98 may correspond to the bowl depth 58, such that contact between the engagement segment 80 and the housing 14 and between the bowl top edge 52 and lid top segment 84 is achieved. For example, a first lid 30a of lesser lid height 98 may be used with a first bowl 28a of lesser bowl depth 58 and a second lid 30b of greater lid height 98 may be used with a second bowl 28b of greater bowl depth 58.

In some embodiments, the blade grinder 10 having a housing 14 with a receiving cavity 18 that may operably receive bowls 28 and lids 30 of varying heights and depths, may result in the blade grinder 10 being able to process food products of varying qualities. For example, the blade grinder 10 may process a large amount of food product when a bowl 28 having a greater bowl depth 58 and a lid 30 having a greater lid height 98 is used. Alternatively, the blade grinder 10 may effectively process a lesser amount of food product when a bowl 28 having a lesser bowl depth 58 and a lid 30 having a lesser lid height 98 is used. In such aspects, the variation in bowl depth 58 and lid height 98 provides for an efficient use of processing space. Additionally, the bowl top edge 52 contacting the lid top segment 84 and transferring the force from the lid bayonet interlock 90, and the bowl collar 56 contacting the foot ring 70 and creating a dampening and retaining force, allows for an increased retaining force as bowls 28 and lids 30 of various bowl depths 58 and lid heights 98 are utilized. Further, the contact between the bowl top edge 52 and the lid top segment 84 and transferring the force from the lid bayonet interlock 90 provides for a single installation, as the bowl 28 is secured in tandem with the lid 30, instead of a separate securement for the bowl 28 independent of the lid 30.

Figure 5:
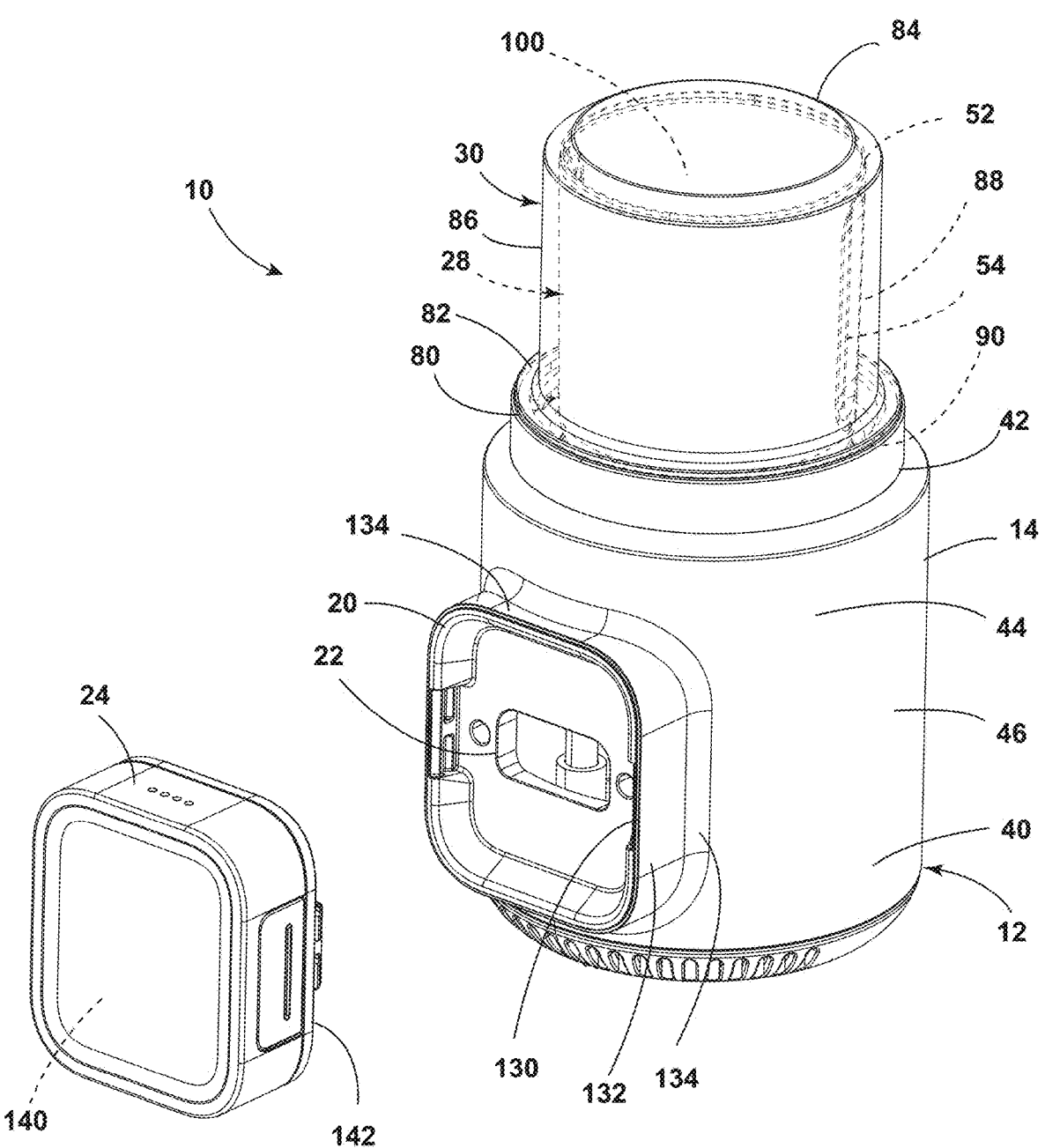
FIG. 5 is top perspective view of a blade grinder having a battery in a detached condition, according to one embodiment.

Referring to FIGS. 1 and 4-5, the bowl 28 and the lid 30 may define a food-processing chamber 100. According to various embodiments, the food-processing chamber 100 may be accessible for the insertion of food products when the bowl 28 is in the resting condition and the lid 30 is in the disengaged condition. Once food product has been inserted into the food-processing chamber 100, the food-processing chamber 100 may be enclosed by moving the lid 30 to the engaged condition.

Referring to FIGS. 1, 2 and 4, the blade grinder 10 includes the drive motor 16. In some embodiments, the drive motor 16 is an electric motor that is positioned within the housing 14 of the blade grinder 10. In various embodiments, the drive motor 16 is configured to drive rotation of the blade implement 26 via a blade shaft 110 and the coupler 60. A variety of types of drive motors 16 are contemplated and can be configured to drive rotation of the blade implement 26.

Referring to FIGS. 2 and 4, the coupler 60 is attached to drive shaft 110. As illustrated in FIG. 4, the drive shaft 110 extends into, and the coupler 60 is disposed within, the receiving cavity 18 of the housing 14. In various implementations, the drive shaft 110 may be coaxial and upward of the drive motor 16 and rotatably coupled to the drive motor 16 such that the drive shaft 110 is coaxial with and may be rotatably driven by the drive motor 16. Further, the drive shaft 110 is coupled to the coupler 60 to transfer rotational force to the coupler 60 such that the blade shaft 110 and the coupler 60 rotate about the same axis. Further still, the blade implement 26 may then be coupled to the coupler 60, through a second coupler 62 engaged with the coupler 60, to transfer rotational force to the blade implement 26 when the bowl 28 is in the use position, described above. In this manner, the assembly of the bowl collar 56 into the receiving cavity 18 engages the blade implement 26 with the coupler 60, with the assembly of lid 30 over the bowl 28 maintaining the blade implement in the engaged arrangement with the coupler 60 for the grinding and/or processing of items (e.g., coffee beans, whole spices, or the like) within the processing cavity 100.

Referring to FIG. 4, the blade implement 26 is disposed within the receiving cavity 18 and is generally upward of the blade shaft 110. In some implementations, the blade implement 26 is positioned above the bottom section 50 of the bowl 28 and is positionable in mechanical communication with the coupler 60, as discussed above. In yet other embodiments, the blade implement 26 may be coupled to the bowl 28 and may operably engage with the coupler 60. The blade implement 26 is configured to rotate, via the coupler 60, as the drive motor 16 exerts a rotational force on the blade shaft 110, as provided herein. It is also generally contemplated that the blade grinder 10 may include a plurality of blade implements 26. For example, a first blade implement 26 may be coupled to a first bowl 28a and a second blade implement 26 coupled to a second bowl 28b.

Referring to FIGS. 1-3, the blade grinder 10 may include a user interface 120. As illustrated in FIGS. 1-3, the exemplified user interface 120 consists of a control element 120 that may be coupled to an internal structure disposed within the housing 14 and may extend outward from the housing outer portion 44. In some embodiments, the control element 120 is movable between an off condition and an on condition. In the off condition, the control element 120 may prevent the blade grinder 10 from activating, even with the battery 24 attached. In the on condition, the control element 120 may activate the blade grinder 10 when the battery 24 is attached. It is generally contemplated that the control element 120 may utilize various control means, such as a controller, a microprocessor, an electromechanical switch, and controller logic to activate and/or deactivate the blade grinder 10. It is also generally contemplated that the control element 120 may comprise multiple conditions. For example, the control element 120 may have the off condition, an on condition of a first speed, an on condition of a second speed, and etc., wherein the different speeds correspond with varying current draws.

Referring to FIGS. 1, 2 and 5, the battery receiver 20 is shown as being defined within a projection 130 that extends outward from the housing 14. As illustrated in FIGS. 1 and 5, the projection 130 may extend outward from the housing outer portion 44 such that the projection 130 has a projection outer surface 132 that is generally perpendicular to the housing outer portion 44 along at least a vertical cross section through a center of the housing 14. Further, in some arrangements, the projection outer surface 132 and the housing outer portion 44 may intersect at a projection corner 134, wherein the projection corner 134 has a gradual radius and curve, such that the curve of the projection corner 134 generally corresponds with the housing outer curvature 46, as illustrated in FIG. 5. In such arrangements, the coinciding curve of the projection corner 134 and the housing outer curvature 46 is such that the housing 14 can be efficiently formed and/or machined, while also providing a projection 130 that integrally extends from the housing 14.

Referring further to FIGS. 1, 2 and 5, the battery receiver 20 is configured to receive the battery 24 for powering the drive motor 16 of the blade grinder 10. In one aspect, the plurality of terminals 22 and electrical components may extend from the battery receiver 20 to the drive motor 16 to facilitate operable electrical connection with mating terminals on the battery 24. In yet other aspects, the battery receiver 20 may receive and couple with the battery 24 via a first tab 140 and a second tab 142. The first tab 140 and the second tab 142 may be configured to allow for operable engagement and release between the battery receiver 20 and the battery 24.

Referring further to FIGS. 1, 2 and 5, the battery 24 is configurable between an attached condition, as shown in FIG. 1, and a detached condition illustrated in FIG. 5. In the attached condition, the battery 24 is coupled to the battery receiver 20 and is electrically coupled to the plurality of terminals 22 such that electric power can be provided to the drive motor 16. In the detached condition, the battery 24 is decoupled from the battery receiver 20, as illustrated in FIG. 5, such as for recharging the battery via a compatible charger, an example of which is discussed in the co-pending, commonly-assigned U.S. patent application Ser. No. 18/115,069 filed Feb. 28, 2023.

The implementation of a battery 24 as a means to power the drive motor 16 is such that the blade grinder 10 is operable without having to attach to an external power source, such as a wall outlet. As such, the blade grinder 10 may be characterized as being cordless and portable. The portability of the blade grinder 10 allows for greater placement and use of the blade grinder 10. For example, the blade grinder 10 may be placed in multiple locations throughout a kitchen, without concern of proximity to a wall outlet.

Additionally, the battery 24 being movable between an attached and detached condition allows for enhanced portability of the blade grinder 10. In particular, once the battery 24 is depleted, the battery 24 may be decoupled from the battery receiver 20 and moved to the detached condition. Next, a user may switch the depleted battery 24 with a charged battery 24, and the depleted battery 24 may be attached to a compatible charger with a receiver similar to the battery receiver 20. Further, as the battery 24 charges, the battery 24 may comprise charge level indicator lights, indicating a charging state of the battery. Further still, said charge level indicator lights may indicate charge level while the blade grinder 10 is in use.

The battery 24 and corresponding electronic circuitry for powering the blade grinder 10, including the operation of the drive motor 16, can be configured according to an architecture using a 12 V power source, with it being understood that the actual voltage supplied and utilized may vary within a range around the described desired operating voltage according to factors generally understood in the art. In this manner, the battery 24 can be a 12 V battery, although other configurations are possible and contemplated. In general, such a voltage may be sufficient for operation of the blade grinder 10, in particular operation of the drive motor 16, which is generally understood to be a direct-current (DC) motor, and in one aspect a brushless DC motor, at an acceptable torque for typically-accepted use as blade grinder within an acceptable operating speed.

In some embodiments, the blade grinder 10 having a housing 14 with a receiving cavity 18 that may operably receive bowls 28 and lids 30 of varying heights and depths, may result in the blade grinder 10 being able to process food products of varying qualities. For example, the blade grinder 10 may process a large amount of food product when a bowl 28 having a greater bowl depth 58 and a lid 30 having a greater lid height 98 is used. Additionally, the bowl top edge 52 contacting the lid top segment 84 and transferring the force from the lid bayonet interlock 90, and the bowl collar 56 contacting the foot ring 70 and creating a dampening and retaining force, allows for an increased retaining force as bowls 28 and lids 30 of various bowl depths 58 and lid heights 98 are utilized.

The invention disclosed herein is further summarized in the following paragraphs and is further characterized by combinations of any and all of the various aspects described therein.

According to one aspect of the present disclosure, a blade grinder includes a base unit having a drive motor and a housing defining a receiving cavity. The housing encloses the drive motor. A battery receptacle is defined on a portion of the housing. The battery receptacle has a plurality of terminals accessible therein and configured to removably couple. The battery with the base unit is configured to operably power the drive motor. A coupler is disposed within the receiving cavity and is configured to be driven by the drive motor. A bowl is operably disposed within the receiving cavity having a blade implemented operably coupled therein and configured to be rotatably driven by the coupler when the bowl is in the operably disposed condition. A lid is couplable to the housing to retain the bowl in the operably disposed condition within the receiving cavity.

According to another aspect, a lid interlock mechanism having a first bayonet portion is defined on a lid engagement segment and a second bayonet portion is defined on a top portion of the housing.

According to another aspect, a lid top section opposes the engagement segment and is in contact with a bowl top edge when the bowl is in the operably disposed condition. The contact between the lid top section and the bowl top edge provides a retaining force that at least partially maintains the bowl in the operably disposed condition.

According to another aspect, a foot ring is disposed within the receiving cavity and is compressible to provide a retaining force between a portion of the bowl and a corresponding portion of the lid when the lid is coupled with the housing to retain the bowl in the operably disposed condition.

According to another aspect, the root ring includes a plurality of feet disposed around a periphery of a housing inner surface. The plurality of feet is resiliently deformable when the bowl is in the operably disposed condition.

According to another aspect, a top edge of the bowl abuts a top segment of the lid. The lid interlock mechanism has a first bayonet portion defined on a lid engagement segment and a second bayonet portion defined on a top portion of the housing is configured to secure the lid and the bowl to the housing According to another aspect, the bowl is a first bowl having a first depth. A second bowl has a greater depth than the first bowl, and the receiving cavity alternately receives the first bowl and the second bowl.

According to another aspect, the lid is a first lid and has a first height that corresponds with the depth of the first bowl. A second lid has a second height that corresponds with the depth of the second bowl.

According to another aspect of the present disclosure, a blade grinder includes a base unit that has a housing. The housing encloses a drive motor and defines a receiving cavity. A foot ring is disposed within the receiving cavity. The foot ring is coupled to an inner surface of the housing that encircles the receiving cavity. A battery receiver is defined along a portion of the housing. The battery receiver has a plurality of terminals housed therein. A battery is removably coupled to the battery receiver. The base unit is configured to operably power the drive motor via the battery. A blade implement is disposed within the receiving cavity. The blade implement is configured to be driven by the drive motor. A bowl is positionable in an operably disposed condition within the receiving cavity. The foot ring is configured to resiliently deform as the bowl is positioned in the operably disposed condition. A lid is couplable to the housing to retain the bowl in the operably disposed condition within the receiving cavity.

According to another aspect, a foot ring includes at least one foot disposed along a periphery of an inner surface of a housing, and the at least one foot is configured to resiliently deform as the bowl is positioned in the operably disposed condition.

According to another aspect, a lid includes an engagement section and a lid lip above the engagement section, and the engagement segment is coupled to the housing and the lid lip abuts a top portion of the housing when the lid is in an engaged condition.

According to another aspect, a blade grinder includes a lid bayonet interlock that has a first bayonet portion defined on a lid engagement segment and a second bayonet portion defined on a top portion of the housing.

According to another aspect, a lid interlock mechanism has a first bayonet portion that is define don a lid engagement segment. A second bayonet portion is defined on a to portion of the housing.

According to another aspect, a lid top segment abuts a bowl top edge when the lid is in an engaged condition, and the lid interlock mechanism provides a compressive force that directs a bowl towards a foot ring, and the foot ring is configured to compress and provide a retaining force between the bowl and the lid to retain the bowl in an operably disposed condition.

According to another aspect, a lid top segment defines a lid channel, and the lid channel receives the bowl top edge when the lid is coupled to the housing to retain the bowl in the operably disposed condition.

According to another aspect, a blade grinder includes a bowl that is a first bowl having a first depth and a second bowl having a greater depth than the bowl, and the first bowl and the second bowl are alternately positionable in respective operably disposed conditions within the receiving cavity of the bas unit.

According to another aspect, a lid is a first lid has a first height that generally corresponds with a depth of a first bowl, and a second lid has a second height that generally corresponds with a depth of a second bowl.

According to another aspect of the present disclosure, a blade grinder includes a base unit that has a housing. The housing encloses a drive motor and defines a receiving cavity. A foot ring is disposed within the receiving cavity and coupled to an inner surface of the housing that encircles the receiving cavity. A projection extends outward from the housing and intersects with the housing at a projection corner. The battery receiver has a plurality of terminals exposed on an open interior thereof. The battery is removably coupled to the battery receiver. The base unit is configured to operably power the drive motor using the battery by electrically coupling with the terminals. A coupler is disposed within the receiving cavity and configured to be driven by the drive motor. A bowl is positionable in an operably disposed condition within the receiving cavity and has a blade implement operably coupled therein and configured to be rotatably driven by the coupler. The bowl is positionable between a resting condition and an engaged condition. A lid is couplable to the housing to retain the bowl in the operably disposed condition within the receiving cavity. The bowl is in the resting condition when the lid is decoupled from the housing. The bowl is in the engaged condition when the lid is coupled to the housing, the coupling between the lid and the housing provides a retaining force that compresses the foot ring against a portion of the bowl.

According to another aspect, a blade grinder includes a bowl that is a first bowl with a first depth and a second bowl that has a greater depth than the bowl, and the first bowl and the second bowl are alternately positionable in respective operably disposed conditions within the receiving cavity of the base unit.

According to another aspect, a blade grinder includes a lid that is a first lid that has a first height that generally corresponds with a depth of a first bowl, and a second lid that has a second height that generally corresponds with a depth of a second bowl.

According to another aspect, a top edge of the bowl abuts a top segment of the lid. A lid interlock mechanism has a first bayonet portion defined on a lid engagement segment and a second bayonet portion defined on a top portion of the housing is configured to secure the lid and the bowl to the housing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A blade grinder comprising: a base unit having a drive motor and a housing defining a receiving cavity, the housing enclosing the drive motor; a battery receptacle defined on a portion of the housing, the battery receptacle having a plurality of terminals accessible therein and configured to removably couple a battery with the base unit to operably power the drive motor; a coupler disposed within the receiving cavity and configured to be driven by the drive motor; a bowl positionable in an operably disposed condition within the receiving cavity and having a blade implement operably coupled therein and configured to be rotatably driven by the coupler when the bowl is in the operably disposed condition; a lid couplable to the housing to retain the bowl in the operably disposed condition within the receiving cavity; and a foot ring disposed within the receiving cavity and compressible to provide a retaining force between a portion of the bowl and a corresponding portion of the lid when the lid is coupled with the housing to retain the bowl in the operably disposed condition.

2. The blade grinder of claim 1, further comprising:
a lid interlock mechanism having a first bayonet portion defined on a lid engagement segment and a second bayonet portion defined on a top portion of the housing.

3. The blade grinder of claim 2, further comprising:
a bowl top edge and a lid top section, wherein the lid top section opposes the engagement segment and the lid top section is in contact with the bowl top edge when the bowl is in the operably disposed condition, and wherein the contact between the lid top section and the bowl top edge provides a retaining force that at least partially maintains the bowl in the operably disposed condition.

4. The blade grinder of claim 1, wherein the root ring includes a plurality of feet disposed around a periphery of a housing inner surface, and wherein the plurality of feet is resiliently deformable when the bowl is in the operably disposed condition.

5. The blade grinder of claim 1, wherein a top edge of the bowl abuts a top segment of the lid, and wherein a lid interlock mechanism having a first bayonet portion defined on a lid engagement segment and a second bayonet portion defined on a top portion of the housing is configured to secure the lid and the bowl to the housing.

6. The blade grinder of claim 1, wherein:
the bowl is a first bowl having a first depth, the blade grinder further including a second bowl having a greater depth than the bowl; and
the receiving cavity alternately receives the first bowl and the second bowl.

7. The blade grinder of claim 6, wherein the lid is a first lid having a first height corresponding with the depth of the first bowl, the blade grinder further comprising:
a second lid having a second height that corresponds with the depth of the second bowl.

8. A blade grinder comprising:
a base unit having a housing, the housing enclosing a drive motor and defining a receiving cavity;
a foot ring disposed within the receiving cavity and coupled to an inner surface of the housing that encircles the receiving cavity;

a battery receiver defined along a portion of the housing, the battery receiver having a plurality of terminals housed therein;
a battery removably coupled to the battery receiver, wherein the base unit is configured to operably power the drive motor using the battery;
a blade implement disposed within the receiving cavity, wherein the blade implement is configured to be driven by the drive motor;
a bowl positionable in an operably disposed condition within the receiving cavity, wherein the foot ring is configured to resiliently deform as the bowl is positioned in the operably disposed condition; and
a lid couplable to the housing to retain the bowl in the operably disposed condition within the receiving cavity.

9. The blade grinder of claim 8, wherein the foot ring includes at least one foot disposed along a periphery of an inner surface of the housing, and wherein the at least one foot is configured to resiliently deform as the bowl is positioned in the operably disposed condition.

10. The blade grinder of claim 8, wherein the lid includes an engagement segment and a lid lip above the engagement segment, and wherein the engagement segment is coupled to the housing and the lid lip abuts a top portion of the housing when the lid is in an engaged condition.

11. The blade grinder of claim 8, further comprising:
a lid interlock mechanism having a first bayonet portion defined on a lid engagement segment and a second bayonet portion defined on a top portion of the housing.

12. The blade grinder of claim 8, wherein a lid top segment abuts a bowl top edge when the lid is in an engaged condition, and wherein the lid bayonet interlock provides a compressive force that directs the bowl towards the foot ring, and wherein the foot ring is configured to compress and provide a retaining force between the bowl and the lid to retain the bowl in the operably disposed condition.

13. The blade grinder of claim 12, wherein the lid top segment defines a lid channel, the lid channel receiving the bowl top edge when the lid is coupled to the housing to retain the bowl in the operably disposed condition.

14. The blade grinder of claim 8, wherein:
the bowl is a first bowl having a first depth;
the blade grinder further includes a second bowl having a greater depth than the bowl; and
the first bowl and the second bowl are alternately positionable in respective operably disposed conditions within the receiving cavity of the base unit.

15. The blade grinder of claim 14, wherein the lid is a first lid having a first height generally corresponding with the depth of the first bowl, the blade grinder further comprising:
a second lid having a second height that generally corresponds with the depth of the second bowl.

16. A blade grinder, comprising:
a base unit having a housing, the housing enclosing a drive motor and defining a receiving cavity;
a foot ring disposed within the receiving cavity and coupled to an inner surface of the housing that encircles the receiving cavity;
a projection extending outward from the housing and intersecting with the housing at a projection corner;
a battery receiver defined within the projection, the battery receiver having a plurality of terminals exposed on an open interior thereof;

a battery removably coupled to the battery receiver, wherein the base unit is configured to operably power the drive motor using the battery by electrically coupling with the terminals;

a coupler disposed within the receiving cavity and configured to be driven by the drive motor;

a bowl positionable in an operably disposed condition within the receiving cavity and having a blade implement operably coupled therein and configured to be rotatably driven by the coupler, wherein the bowl is positionable between a resting condition and an engaged condition; and a lid couplable to the housing to retain the bowl in the operably disposed condition within the receiving cavity, wherein the bowl is in the resting condition when the lid is decoupled form the housing, and wherein the bowl is in the engaged condition when the lid is coupled to the housing, the coupling between the lid and the housing providing a retaining force that compresses the foot ring against a portion of the bowl.

17. The blade grinder of claim 16, wherein:

the bowl is a first bowl having a first depth;

the blade grinder further includes a second bowl having a greater depth than the bowl; and the first bowl and the second bowl are alternately positionable in respective operably disposed conditions within the receiving cavity of the base unit.

18. The blade grinder of claim 17, wherein the lid is a first lid having a first height generally corresponding with the depth of the first bowl, the blade grinder further comprising:

a second lid having a second height that generally corresponds with the depth of the second bowl.

19. The blade grinder of claim 16, wherein a top edge of the bowl abuts a top segment of the lid, and wherein a lid interlock mechanism having a first bayonet portion defined on a lid engagement segment and a second bayonet portion defined on a top portion of the housing is configured to secure the lid and the bowl to the housing.

\* \* \* \* \*